(12) United States Patent
Dietrich et al.

(10) Patent No.: US 11,589,132 B2
(45) Date of Patent: *Feb. 21, 2023

(54) METHODS AND APPARATUS FOR INTEGRATING MEDIA ACROSS A WIDE AREA NETWORK

(71) Applicant: Rovi Solutions Corporation, San Jose, CA (US)

(72) Inventors: Bradley Dietrich, San Francisco, CA (US); Daniel Putterman, San Francisco, CA (US); Gregory Peters, San Francisco, CA (US); Richard Bullwinkle, Palo Alto, CA (US)

(73) Assignee: Rovi Solutions Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,585

(22) Filed: Jan. 9, 2019

(65) Prior Publication Data
US 2019/0222903 A1 Jul. 18, 2019

Related U.S. Application Data

(63) Continuation of application No. 15/255,799, filed on Sep. 2, 2016, now Pat. No. 10,182,267, which is a
(Continued)

(51) Int. Cl.
*H04N 21/61* (2011.01)
*H04N 21/436* (2011.01)
(Continued)

(52) U.S. Cl.
CPC .......... *H04N 21/6125* (2013.01); *H04L 9/40* (2022.05); *H04L 65/70* (2022.05); *H04L 69/329* (2013.01);
(Continued)

(58) Field of Classification Search
CPC .......... H04N 21/6125; H04N 21/4227; H04N 21/43615; H04N 21/47202; H04L 29/06; H04L 69/329
See application file for complete search history.

(56) References Cited

U.S. PATENT DOCUMENTS

| | | | |
|---|---|---|---|
| 6,006,265 A * | 12/1999 | Rangan | H04N 7/17318 709/226 |
| 6,233,428 B1 * | 5/2001 | Fryer | G09B 5/02 434/308 |

(Continued)

FOREIGN PATENT DOCUMENTS

WO 0231701 4/2002

*Primary Examiner* — Khaled M Kassim
(74) *Attorney, Agent, or Firm* — Haley Guiliano LLP

(57) ABSTRACT

A system for distributing media includes a wide area network (WAN), a media player coupled to the WAN at a first home, and a media server coupled to the WAN at a second home for providing media. A service is coupled to the WAN for receiving a request for media from the media player and for establishing a connection between the first and second homes over the WAN. Media is streamed across the WAN from the second home to the first home. The system may include a storage device coupled to the media player where media is transferred across the WAN for storage at the storage device. A media device may be coupled to the media player for playing the streamed/transferred media where the media player and the media device may comprise a television, stereo, or computer and the media item may comprise video, photographs, or audio.

20 Claims, 13 Drawing Sheets

Related U.S. Application Data continuation of application No. 11/318,793, filed on Dec. 27, 2005, now Pat. No. 9,467,322.

(51) Int. Cl.

| | | |
|---|---|---|
| *H04N 21/4227* | (2011.01) | |
| *H04N 21/472* | (2011.01) | |
| *H04L 69/329* | (2022.01) | |
| *H04L 9/40* | (2022.01) | |
| *H04L 65/70* | (2022.01) | |
| *H04N 21/222* | (2011.01) | |
| *H04N 21/63* | (2011.01) | |
| *H04N 21/233* | (2011.01) | |

(52) U.S. Cl.
CPC ....... *H04N 21/222* (2013.01); *H04N 21/4227* (2013.01); *H04N 21/43615* (2013.01); *H04N 21/47202* (2013.01); *H04N 21/632* (2013.01); *H04N 21/2335* (2013.01)

(56) References Cited

U.S. PATENT DOCUMENTS

| | | | | |
|---|---|---|---|---|
| 9,715,500 | B2* | 7/2017 | Cue | G06F 3/0482 |
| 2002/0049846 | A1* | 4/2002 | Horen | H04L 47/10 |
| | | | | 709/226 |
| 2002/0077984 | A1* | 6/2002 | Ireton | G06F 21/10 |
| | | | | 705/51 |
| 2002/0083124 | A1* | 6/2002 | Knox | G06F 16/10 |
| | | | | 709/203 |
| 2002/0151327 | A1* | 10/2002 | Levitt | H04N 21/4126 |
| | | | | 455/556.1 |
| 2002/0152318 | A1* | 10/2002 | Menon | H04N 21/2225 |
| | | | | 709/231 |
| 2003/0069904 | A1* | 4/2003 | Hsu | G06F 21/10 |
| 2003/0115598 | A1* | 6/2003 | Pantoja | H04N 5/44591 |
| | | | | 725/40 |
| 2003/0131226 | A1* | 7/2003 | Spencer | G06F 8/61 |
| | | | | 713/100 |
| 2003/0212804 | A1 | 11/2003 | Hashemi | |
| 2003/0216958 | A1* | 11/2003 | Register | G06Q 30/02 |
| | | | | 705/14.61 |
| 2004/0088731 | A1* | 5/2004 | Putterman | H04L 29/06027 |
| | | | | 725/94 |
| 2004/0249815 | A1* | 12/2004 | Lee | G06F 21/105 |
| 2005/0002638 | A1 | 1/2005 | Putterman et al. | |
| 2005/0033850 | A1* | 2/2005 | Kirkland | H04L 63/10 |
| | | | | 709/228 |
| 2005/0086356 | A1* | 4/2005 | Shah | G06Q 10/109 |
| | | | | 709/231 |
| 2005/0232210 | A1* | 10/2005 | Karaoguz | H04L 29/06027 |
| | | | | 370/338 |
| 2006/0168219 | A1* | 7/2006 | Ahluwalia | H04L 67/16 |
| | | | | 709/225 |
| 2006/0218650 | A1* | 9/2006 | Costa-Requena | G06F 21/10 |
| | | | | 726/27 |
| 2006/0232677 | A1* | 10/2006 | Butaney | H04N 5/23203 |
| | | | | 348/207.1 |
| 2006/0236352 | A1* | 10/2006 | Scott | H04N 5/76 |
| | | | | 725/89 |
| 2006/0253589 | A1* | 11/2006 | Shiraki | H04L 65/4061 |
| | | | | 709/226 |
| 2007/0055743 | A1* | 3/2007 | Pirtle | H04L 67/2842 |
| | | | | 709/217 |
| 2007/0208948 | A1* | 9/2007 | Costa-Requena | H04L 63/101 |
| | | | | 713/185 |
| 2007/0270209 | A1* | 11/2007 | Moshal | G06Q 50/34 |
| | | | | 463/25 |
| 2010/0005496 | A1* | 1/2010 | Ellis | H04N 7/17309 |
| | | | | 725/87 |

* cited by examiner

METHODS AND APPARATUS FOR INTEGRATING MEDIA ACROSS A WIDE AREA NETWORK

CROSS-REFERENCE TO RELATED APPLICATIONS

This application is a continuation of U.S. patent application Ser. No. 15/255,799, filed Sep. 2, 2016, (allowed), which is a continuation of U.S. patent application Ser. No. 11/318,793, filed Dec. 27, 2005, now U.S. Pat. No. 9,467, 322, issued Oct. 11, 2016, the contents of which are hereby incorporated by reference herein in their entireties.

BACKGROUND OF THE INVENTION

Field of the Invention

The present invention is directed toward the field of networking consumer electronic devices, and more particularly directed toward aggregating media from multiple, media devices over a wide area network.

Art Background

The widespread use of computers, digital cameras, digital music and video players, and the Internet has resulted in the creation and use of digital media. Digital media has also largely replaced more traditional analog audio and video formats with the introduction and popular acceptance of audio compact discs (CDs) and digital video discs (DVDs). In general, digital media consists of various formats of data that stores audio, video, and images in binary files. These binary files are typically stored on a medium accessible to computer devices, such as CD-ROMs, hard drives, floppy disks and memory sticks.

The storage of digital media on commonly used computer medium allows for easy generation and transfer of digital media. For example, it has become popular to generate digital photos using a digital camera and then to transfer the digital photos onto computers. Computer software permits the user to manipulate the digital photos. The user may then transfer the digital photos to friends using e-mail, or post the digital photos on a web site accessible on the World Wide Web. These types of applications, which take advantage of connectivity among different devices, have also contributed to the widespread popularity of digital media.

Digital media may be stored in a variety of formats. Special hardware or software compatible with the formats of the digital media is required to playback or view the digital media. For example, to listen to music stored in the popular MP3 format, a consumer must have a special MP3 player (i.e., either software running on a general purpose computer or a stand alone MP3 player). There are numerous formats for video, including high quality DVDs and various compression based MPEG and proprietary standards. To playback various formats of digital video, the consumer must use a device that reads the proper format of the digital media.

Because of the numerous different formats of digital media, the playback or viewing of numerous types of digital media today requires multiple types of devices. The playback of digital media stored in different formats is less problematic on a computer because the computer may play the digital media using software programs. However, a consumer may desire to play the media on other types of devices. For example, the consumer may desire to play digital audio files on a home stereo and view digital video on a television. Currently, stereos and televisions are not equipped to playback all formats of digital media. In addition, consumers may want to playback media located at different locations. For example, a consumer may want to view digital photos stored on a relative's computer in a different city on the consumer's television. Accordingly, it is desirable to provide a media system that integrates various types of digital media stored in disparate locations into a single system.

SUMMARY OF THE INVENTION

A system for distributing media is provided. In some embodiments, the system includes a wide area network, a digital media player coupled to the wide area network and being located at a first home, and a digital media server also coupled to the wide area network and being located at a second home for providing at least one media item to the wide area network. A wide area network media service is also coupled to the wide area network for receiving a request for media from the digital media player and for establishing a connection between the first home and the second home over the wide area network. The media is then streamed across the wide area network from the second home to the first home. In some embodiments, a media device is coupled to the digital media player for playing the streaming media. The digital media player and the media device may comprise a television and the media item may comprise video or digital photographs. Also, the digital media player and the media device may comprise a stereo and the media item may comprise audio. In addition, the digital media player and the media device may comprise a computer.

In other embodiments the system also includes a storage device coupled to the digital media player for storing digital media files. In these embodiments, the wide area network media service may receive a request for at least one digital media file from the digital media player and then establishes a connection between the first home and the second home over the wide area network. The media is then transferred across the wide area network from the second home to the first home for storage at the storage device.

DETAILED DESCRIPTION

A media system integrating a plurality of media devices located in different geographic locations is provided. The media devices may be located in geographically disparate locations, and the media system integrates the media devices over a wide area network. For example, the integrated media system permits playback of media items at one location even though the media items reside at a different location.

Figure 1:
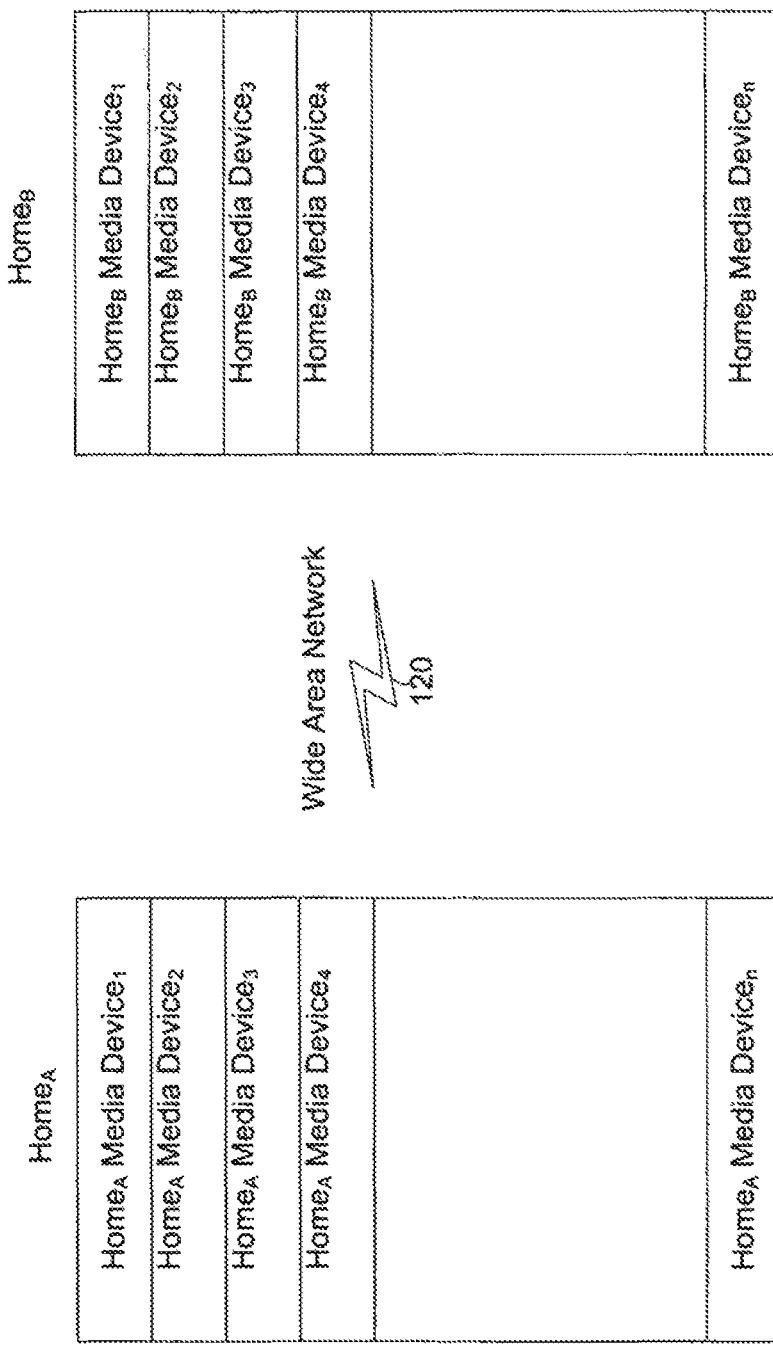
FIG. 1 illustrates one embodiment for implementing an integrated media system across a wide area network.

FIG. 1 illustrates one embodiment for implementing an integrated media system across a wide area network. As shown in FIG. 1, two homes with multiple media devices are shown. A first home with multiple media devices is labeled $Home_A$, and a second home, also with multiple media devices, is labeled $Home_B$. As used herein, a media device includes any type of device, such as a consumer electronic device, that provides one or more services for or operations on media. Examples of services, a media device may provide include playback, storage, generation and manipulation of media, etc. For the example of FIG. 1, both $Home_A$ and Homes include "n" media devices. $Home_A$ and $Home_B$ communicate through wide area network 120. Wide area network 120 may comprise one or more types of communication networks, such as a public packet based network (e.g., the Internet). Each home may connect to wide area network 120 through a high-bandwidth connection (e.g., cable, DSL, satellite, etc.).

In some embodiments of the invention, components do not necessarily refer to specific hardware or software configurations, but refer to roles that the components perform or partially perform. One or more devices that perform the role of playing back any form of digital media is referred to as a media device ("MD"). For example, a television, which can play video and display photos, performs the role of a media device. A stereo performs the role of a media device by playing audio. A digital media player ("DMP"), as used herein, connotes a role to play digital media (e.g., process a digital media file and output signals suitable for play on a media device). For example, an MPEG player that processes MPEG video files and generates a video output is an example of a digital media player. A consumer electronics device may perform more than one role. For example, a computer may run a digital media player, such as Quicktime player, that reads a digital video file, and plays the video on the computer display. For this example, the computer performs roles as both a digital media player and a media device.

A device that performs the role of a digital media server ("DMS") is a device that serves digital media to a network of consumer electronic devices (e.g., digital media players or a media devices). A device may also perform the role of a digital media server if the device performs protocol bridging services. A protocol bridging service accepts requests or commands in a first protocol and translates the command into a second protocol to interface two consumer electronic devices. A digital media server may include storage, although the role of media storage is separate from the role of a digital media server. A device, performing the role of a digital media server, nay serve media stored within the digital media server or may acquire media external to the digital media server.

Figure 2:
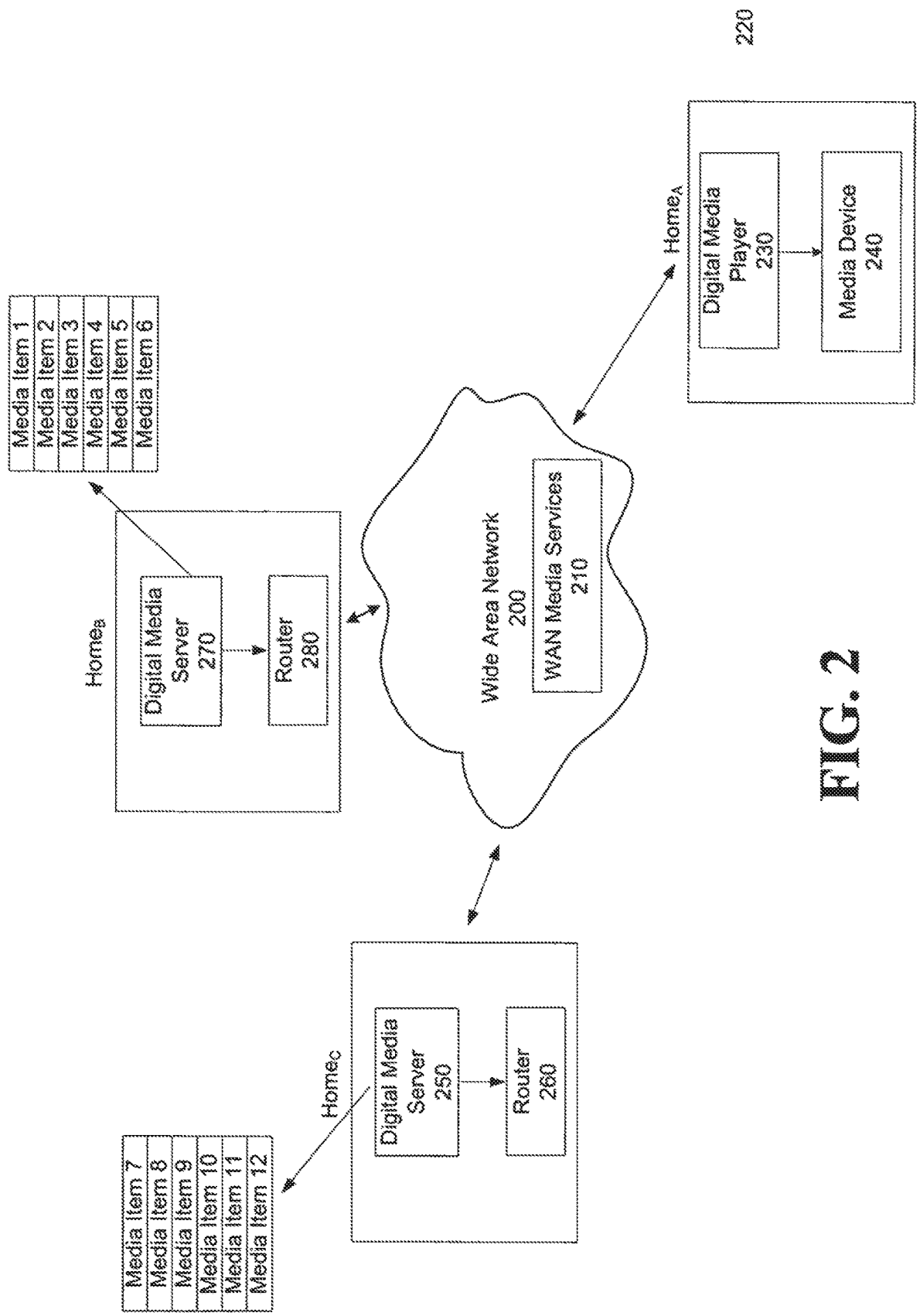
FIG. 2 is a block diagram illustrating one embodiment for streaming media across a wide area network.

FIG. 2 is a block diagram illustrating one embodiment for streaming media across a wide area network. The example of FIG. 2 illustrates streaming media from two different locations (e.g., homes) to a third location. However, the techniques described herein apply to streaming media across a wide area network from one or more devices located in one or more disparate geographical locations. For the example of FIG. 2, a user at $home_A$ desires to receive media items stored on devices at $home_B$ and $home_C$. $Home_A$, $home_B$ and $home_C$ are all coupled to wide area network 200. Wide area network ("WAN") media services 210 are also accessible via wide area network 200. As described more fully below, in some embodiments, WAN media services perform, functions to integrate media over the wide area network.

For this embodiment, $home_A$ includes digital media player 230 and media device 240. $Home_B$, includes router 280 and digital media server 270. Similarly, $home_C$ has, in one configuration, router 260 and digital media server 250. Although $home_C$ and $home_B$ are shown as having digital media servers to perform the role of serving media items across the wide area network; any device that serves media items to the wide area network may be used without deviating from the spirit or scope of the invention. Also, home media networks for $home_B$ and $home_C$ are shown with a digital media servers and a plurality of media items. However, a home media network may comprise any combination of one or more digital media servers, storage devices; digital media players, and media devices, without deviating from the spirit or scope of the invention.

The routers (260 and 280) are used to provide network access from $home_B$ and $home_C$ to the wide area network. In one embodiment, routers 260 and 280 are network address translation ("NAT") routers. For this configuration, there are no inbound TCP connections. The connections are all outbound to provide connectivity from the digital media servers to the wide area network.

As shown in FIG. 2, $home_B$ includes media items, available for access by digital media player 230, 1-6. $Home_C$ includes media items 7-12 available for access by digital media player 230. In operation, digital media player 230, at $home_A$, initiates a connection with WAN media services 210, and uniquely identifies itself. In response, WAN media services 210 determines media available to the digital media player 230 and the location of the available media. Thus WAN media services 210 acts as a well-known broker to provide automatic discovery of other nodes across the WAN.

The WAN media services stores "group information." In general, the group information identifies media available to a device (e.g., digital media player). In one embodiment, the group information links a device to a user. A user may be associated with multiple devices. The user may be associated with one or more groups. For example, a user may create a ski group to link individuals interested in skiing. The users in a group specify content available to members in that group. For example, a member of the ski group may specify a device and a content directory—subdirectory for the device that stores all content available to members of the ski group (e.g., content related to skiing).

The WAN media system can provide a user interface to allow users to set-up groups, identify individuals and devices with a group, identify content directories that store content for the group, and invite others to join the group. In one embodiment, a user may be the owner of a group. Through use of a digital media player or computer system that implements a user interface, the user may navigate to the group information to set-up or edit the group information. Other group members may also edit group information associated with the user or the user's device. In other embodiments, the WAN media services may provide a search mechanism to permit the user to search for content for which the user has been granted permissions. Although the above description provides a framework to link devices, users, and content in groups, group information, as used herein, may contain any information used to link one ore more users or devices to content.

For the example of FIG. 2, WAN media services 210 determines that the digital media player 230, at home$_A$, has permission to access media items 1-6 at home$_B$ and media items 7-12 at home$_C$. WAN media services 210 then brokers a connection from home$_B$ and home$_C$ to home$_A$. A view of the available media may be aggregated to permit a user, manually or automatically, to select one or more media items. Embodiments for aggregating media (e.g., services server and client aggregation) are described more fully below. Digital media player 230 initiates selection of one or more media items. In response, one or more media items are streamed from home$_B$ and/or home$_C$ to digital media player 230. In one embodiment, as described more fully below, home$_B$, home$_C$, and/or WAN media services 210 may perform one or more functions to transcoding the media item and/or to acquire keys for digital rights management. The streaming media is delivered to digital media player 230, and subsequently played on media device 240.

Figure 3:
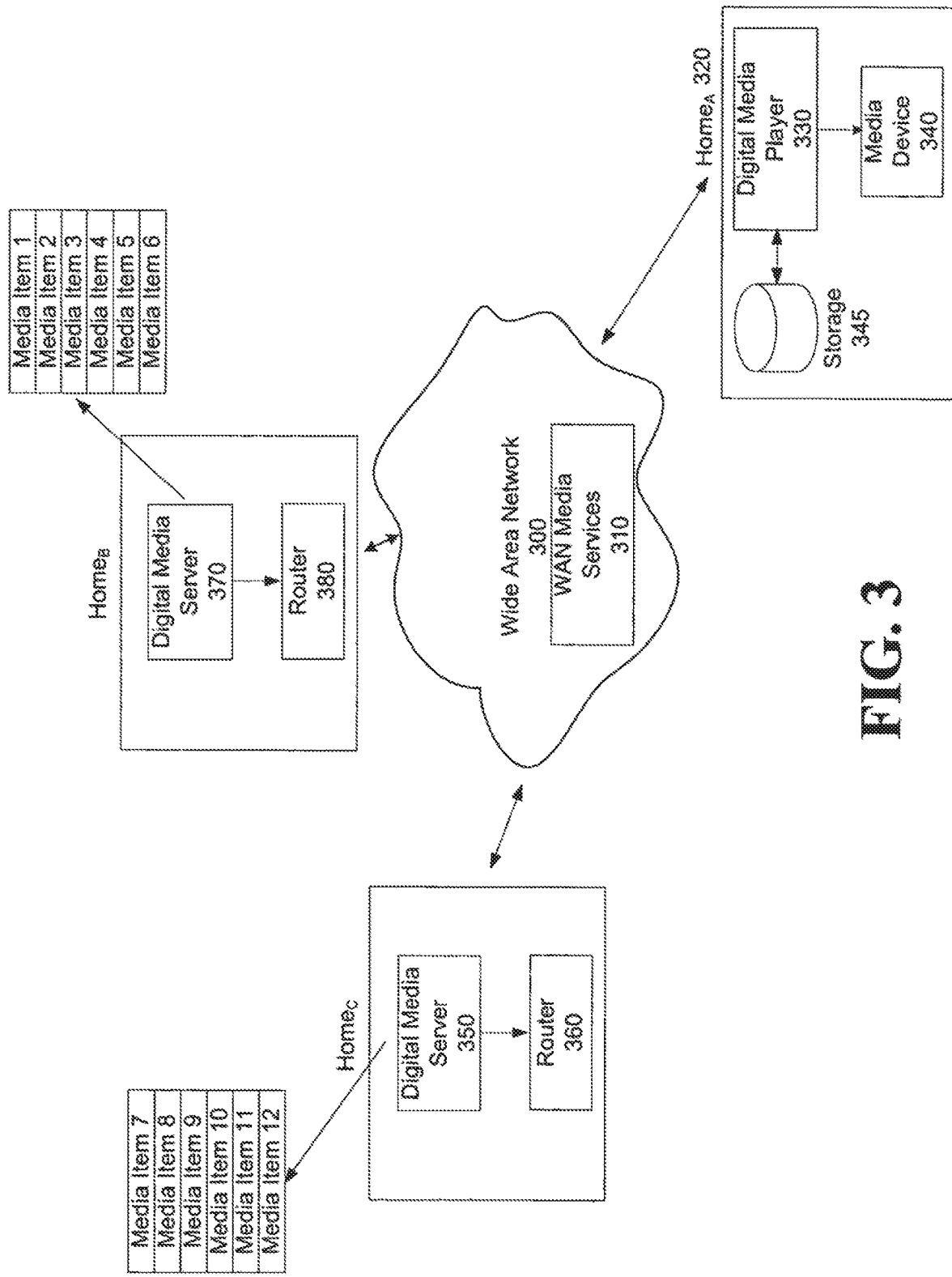
FIG. 3 illustrates one embodiment for copying media items across a wide area network.

FIG. 3 illustrates one embodiment for copying media items across a wide area network. This configuration, similar to the example embodiment of FIG. 2, illustrates a three home scenario, wherein home$_A$ desires to access media available at home$_B$ and home$_C$. However, for the embodiment of FIG. 3, home$_A$ copies the media on to a storage medium. Thus, for this embodiment, home$_A$ includes storage 345 coupled to digital media player 330. The process to copy media items is similar to the process to stream media items discussed above in conjunction with FIG. 2. The digital rights management protections may be different to protect or prevent copying of media items. Also, since transfer is not required to be in "real time," content may be trickled down during idle times. After home$_A$ initiates a copy operation of one or more media items from home$_C$ and/or home$_B$, media items are transferred over the wide area network 210 from home$_B$ and/or home$_C$ to home$_A$ for storage on storage 345.

The WAN media system of the present invention may also implement synchronization services. For this embodiment, a process may be initiated to copy media items every time a media item is added or modified to a content directory. For example, a user may update one or more digital photos in a content directory. The synchronization service, running on a device coupled to the storage of the content directory, identifies that a new digital photo has been added to the content directory, and copies the new digital photos to the specified devices, accessible to the wide area network. In one embodiment, the synchronization services, at a first location, may access the group information to identify one or more devices, located at disparate locations, so as to copy the new or modified media items to the devices.

Figure 4:
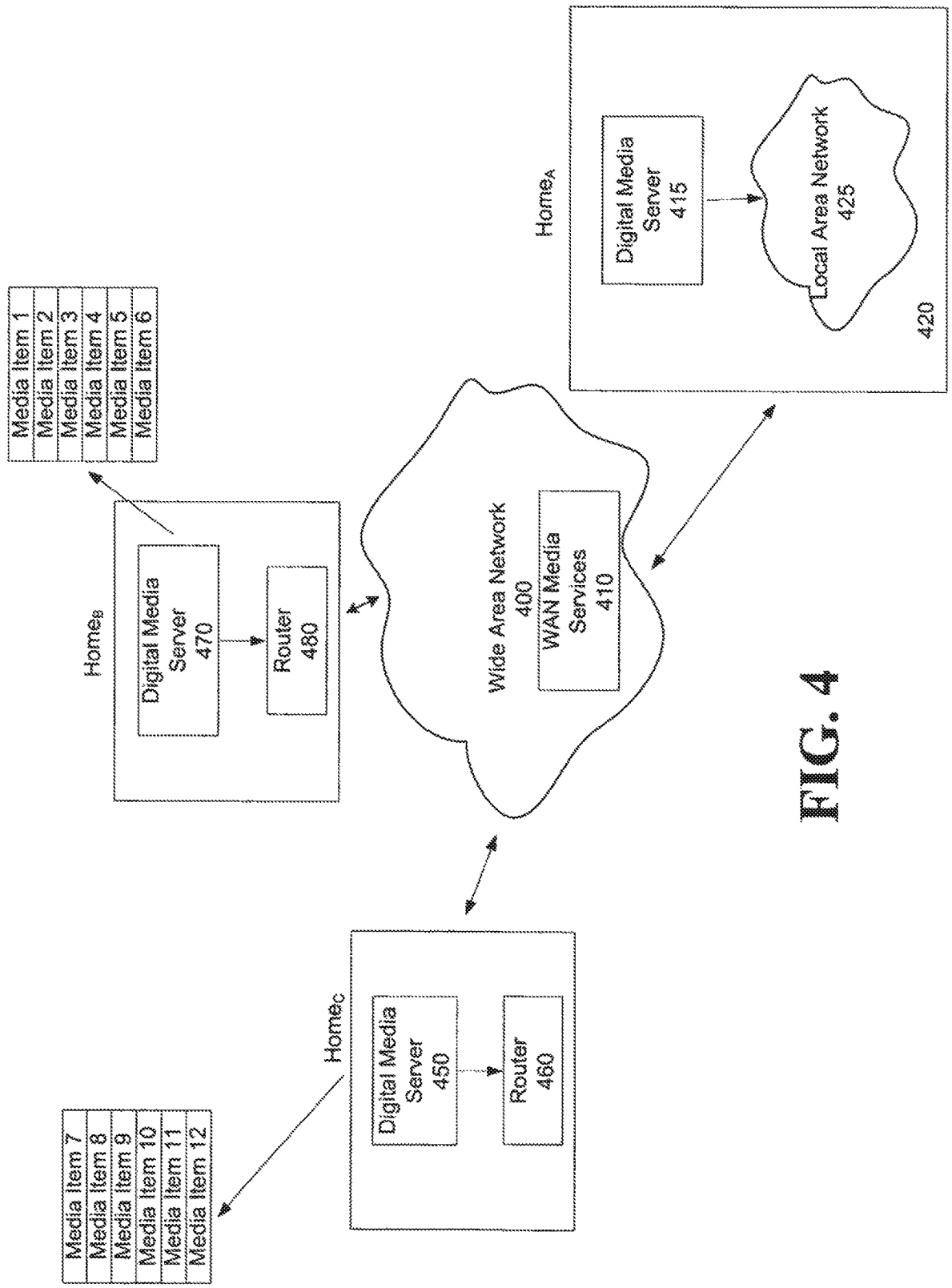
FIG. 4 illustrates another embodiment for integrating media across a wide area network.

FIG. 4 illustrates another embodiment for integrating media across a wide area network. For this embodiment, home$_A$ (420) includes a home media network. As shown in FIG. 4, home$_A$ includes a digital media server 415 coupled to a local area network (LAN) 425. For the example implementation of FIG. 4, digital media server 415 is coupled to local area network 425. Local area network 425 may couple one or more digital media servers, digital media players, and media devices. One embodiment for a home media network is described below in conjunction with a description of FIG. 13. For this example, digital media server 415 presents media items to local area network 425. To integrate media over wide area network 400, digital media server 415 initiates a connection with WAN media services 410 through LAN 425. Similar to the embodiments of FIGS. 2 and 3, WAN media services 410 identifies digital media servers available to digital media server 415 (i.e., based on group information), and brokers one or more connections to permit discovery, selection and delivery (copying or streaming) of media from home$_C$ and home$_B$ to home$_A$.

Figure 5:
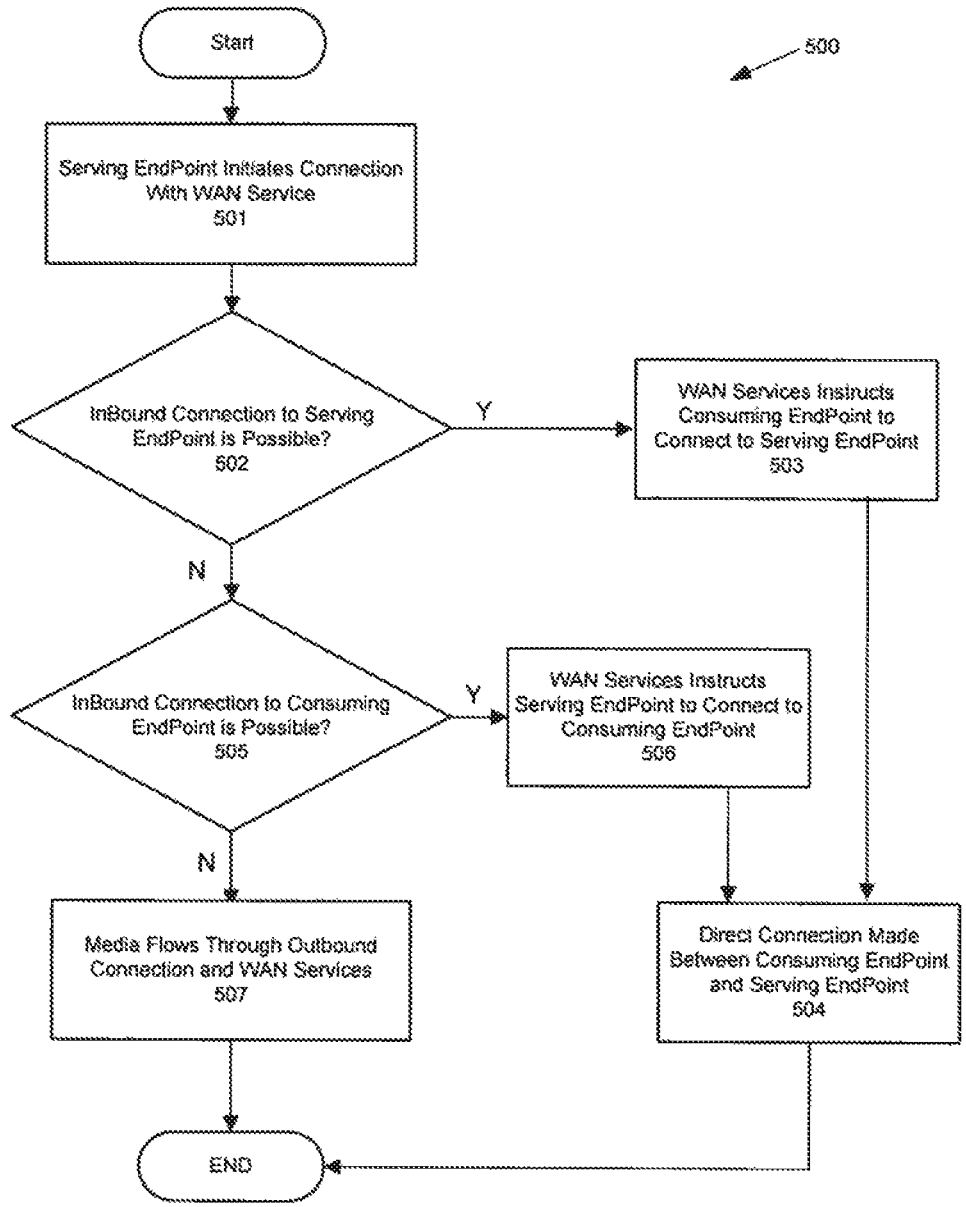
FIG. 5 is a flow diagram illustrating an alternative embodiment for integrating media items across a wide area network.

FIG. 5 is a flow diagram illustrating one embodiment of a method 500 for integrating media items across a wide area network (WAN). As used herein, a serving endpoint refers to a first point (e.g., first home) coupled to the WAN and a consuming endpoint refers to a second point (e.g., second home) coupled to the WAN. As discussed below, the method 500 for integrating media items may comprise a direct connection maintained between the serving and consuming endpoints or a connection maintained through a WAN media service.

The method 500 begins when the serving endpoint initiates (at 501) a connection with a WAN media service. The WAN media service then determines (at 502) whether the inbound connection to the serving endpoint is possible. If so, the WAN media service then instructs (at 503) the consuming endpoint to connect to the serving endpoint and a direct connection is made (at 504) between the consuming and serving endpoints. The method 500 then ends.

If the WAN media service determines (at 502—No) that the inbound connection to the serving endpoint is not possible, the WAN media service then determines (at 505) whether an inbound connection to the consuming endpoint is possible. If so, the WAN media service then instructs (at 506) the serving endpoint to connect to the consuming endpoint and a direct connection is made (at 504) between the consuming and serving endpoints. The method 500 then ends.

If the WAN media service determines (at 505—No) that the inbound connection to the consuming endpoint is not possible, media then flows (at 507) through an outbound connection and the WAN media service. The method 500 then ends.

Figure 6:
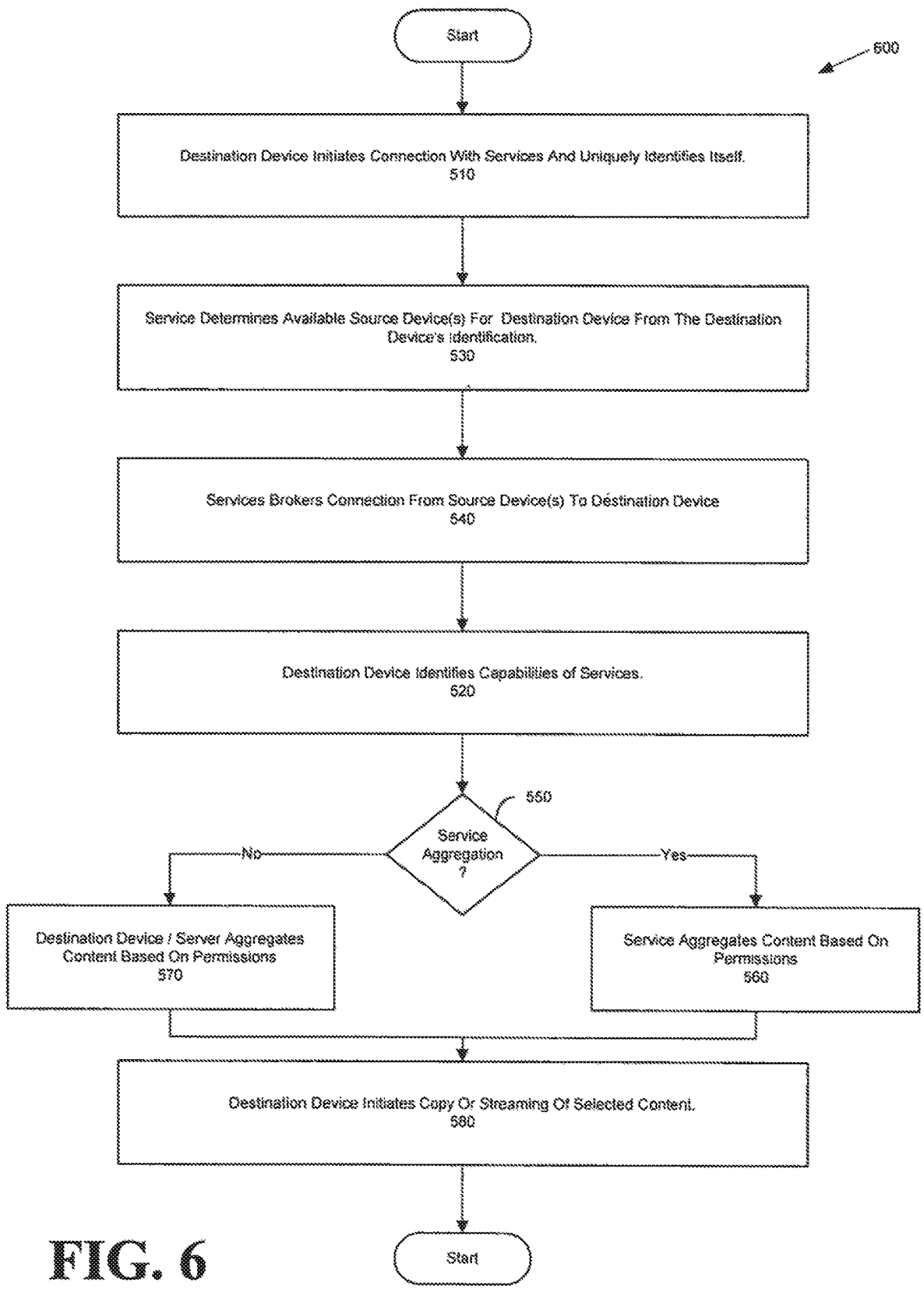
FIG. 6 is a flow diagram illustrating an alternative embodiment for integrating media items across a wide area network.

FIG. 6 is a flow diagram illustrating an alternative embodiment of a method 600 for integrating media items across a wide area network. As discussed below, the alternative method 600 for integrating media items comprises a connection maintained through a WAN media service. For purposes of nomenclature, a destination device, as used herein, refers to a device that receives media items. For example, a destination device may comprise a digital media server, digital media player, etc. A source device, as used herein, refers to a device that delivers one or more media items to the wide area network. For the example in the embodiments of FIGS. 2, 3 and 4, the source device comprises a digital media server.

The method 600 begins the process to integrate media items across a wide area network when the destination device initiates a connection with WAN media services and uniquely identifies itself (block 510, FIG. 6). In one embodiment, to accomplish this, each device is programmed to access, over the WAN, the WAN media services at a predetermined universal resource locator ("URL") address. Each device has a unique number, similar to a serial number. The destination device transmits this unique number to the WAN media services. In some embodiments, public/private key cryptography may be used to guarantee authenticity.

Using the destination devices identification, the WAN media service identifies a user associated with the destination device from the "group information." There may be several source devices associated with a user or group of users. The WAN media service identifies source devices available for the destination device (block 530, FIG. 6). As described mote fully below, the WAN media service identifies one or more source devices that have granted permission to the destination device for media access.

The WAN media service brokers a connection from one or more source devices and the destination device (block 540, FIG. 6). To accomplish this, the WAN media service and the source device(s) establish a connection through the router at each home location. The WAN media service directs this communications channel to the destination device. Once the WAN media service brokers a connection from the source device(s) to the destination device, the connection can be maintained directly between the source device(s) and the destination device, or continue through the WAN services. The destination device discovers the content and of services available (block 520, FIG. 6). For example, the destination device may discover file formats (i.e., to determine capability of the digital media player), digital rights management policies for media items available over the wide area network, available bandwidth between source and destination nodes, and roles for source and destination devices.

The user at the destination device may receive a list of media items available across the wide area network. In order to discover a list of available media items, the media items, available to the destination device from multiple source devices, are aggregated. In one embodiment, the WAN media service aggregates a list of media items from multiple source devices. This type of media aggregation is referred to herein as "service aggregation." Service aggregation is described more fully below in conjunction with a discussion of FIG. 11. Another type of aggregation that may be used is referred to as "server aggregation." In server aggregation, a digital media server aggregates a list of available media items for presentation to a local area network. For example, the destination device may comprise a digital media player coupled to a local area network. A digital media server may also be coupled to the local area network. To perform server side aggregation, the digital media server aggregates a list of all available media items for presentation to the media devices and digital media players (destination device) on the local area network. Server aggregation is described more fully below in conjunction with a discussion of FIG. 12. A third type of media aggregation is referred to as "client side aggregation." In client side aggregation, the destination device itself discovers, and aggregates all media items available to it. Client aggregation is described more fully below in conjunction with a discussion of FIG. 10.

If the technique uses service aggregation, then the WAN media service aggregates content based on permissions and possibly capabilities of the network, i.e., high bandwidth items may not show up for streaming media on a slow connection (blocks 550 and 560, FIG. 6). If the technique uses either client or server side aggregation, the destination device, or a server coupled to the local area network of the destination device, aggregates content based on permissions (blocks 550 and 570, FIG. 6). The destination device initiates either a copy or stream operation for one or more media items (block 580, FIG. 6). In one embodiment, the user, from the digital media player or digital media server, selects one or more media items displayed as a result of the discovery services. In other embodiments, the stream or copy operation may be initiated by an automated process, such as the synchronization service described above.

Figure 7:
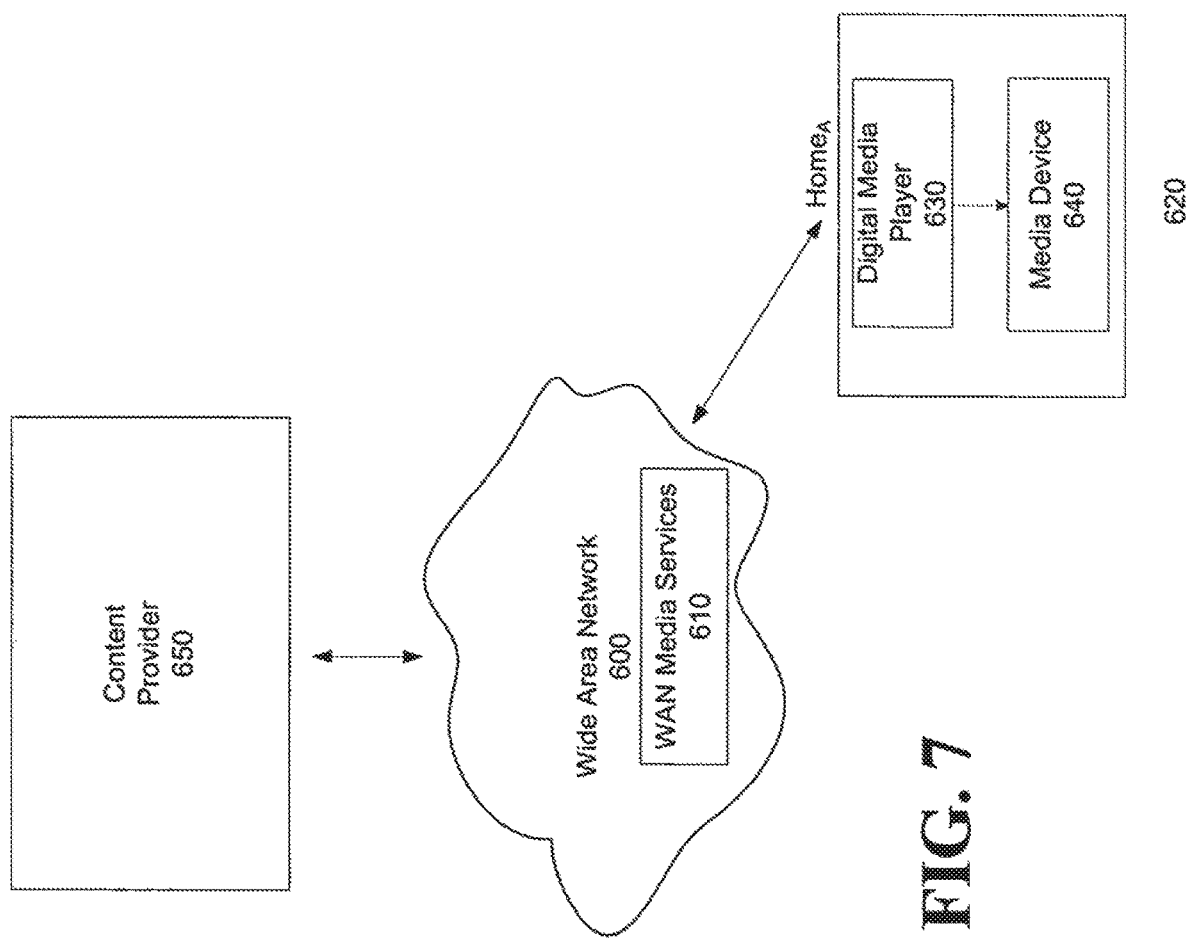
FIG. 7 illustrates one embodiment for integrating media from a content provider into the wide area network.

In one embodiment, content from commercial content providers is integrated into the wide area network. FIG. 7 illustrates one embodiment for integrating media from a content provider into the wide area network. For the example of FIG. 7, home$_A$ (620) is coupled to wide area network 600. WAN media service 610 is also accessible to the wide area network 600. One or more content providers are depicted as content provider 650 in FIG. 7. A content provider, as used herein, refers to a commercial enterprise that distributes media. The media may include digital audio, digital video or photos or text typically, the content provider receives payment for delivery (e.g., streaming or copying) of media. In one embodiment, WAN media services 610 may serve as a broker to deliver commercial content from one or more content providers to consumers. Under this scenario, WAN media services 610 may facilitate purchase of content, selected by the user, from several different content providers. In one embodiment, the content providers may receive payment from the WAN media services, and in turn, provide the user with one-integrated invoice.

The content provider and a user may either conduct a streaming operation or a copy operation. For a copy operation, home$_A$ includes a storage device (not shown). In operation, a user, at home$_A$, initiates selection of available media from content provider 650. In one embodiment, WAN media services 610 may perform "service aggregation" to provide a list of available content from one or more content providers. In other embodiments, aggregation may occur at the home (e.g., server-side or client-side media aggregation). The user selects media, from a device (e.g., digital media player) from the available list of media items. In response to the selection, WAN media services 610 brokers a connection to transfer (either copy or stream) media items from a content provider to the user's digital media player. The WAN media services may also act as a broker to pay content providers on behalf of users. This permits users of the WAN media system to maintain one account for purchase of content owned by several different content providers.

The digital media player 630 establishes a connection with the WAN media service 610. In turn, WAN media service 610 establishes a connection with one or more content providers. For this configuration, a device, such as a digital media player, does not require knowledge to directly connect to external content providers. The use of a third party service (e.g., WAN media service) facilitates connectivity between homes and content providers because most home network connections permit only outbound connections, and therefore content providers have no means of directly accessing user devices at the home.

Figure 8:
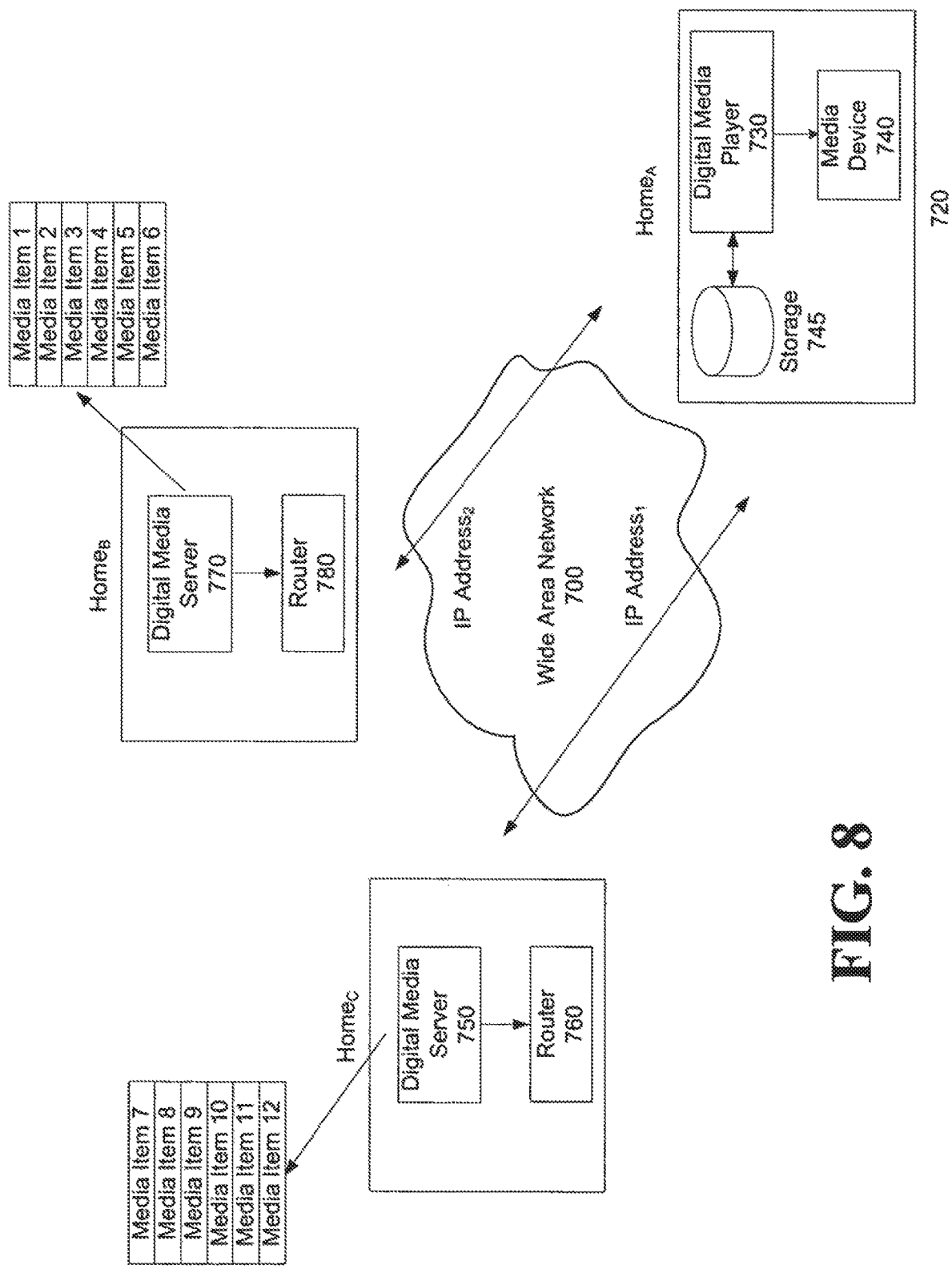
FIG. 8 illustrates one embodiment for integrating media across a wide area network using static IP addresses.

Direction Integration of Media Across the Wide Area Network:

The embodiments described above use a WAN media service (third party) to broker connections between source and destination devices. In other embodiments, a third party service, such as the WAN media service, is not used. FIG. 8 illustrates one embodiment for integrating media across a wide area network using static IP addresses. For this embodiment, a destination device (e.g., digital media player) communicates with source devices at home$_B$ and home$_C$ through a direct IP connection. For this embodiment, the group information, which specifies groups and permissions, devices, users, etc. within the groups, is stored at the user locations (e.g., home$_A$, home$_B$ and home$_C$). For the example illustrated in FIG. 8, digital media player 730, at home$_A$, is the destination device. A user desires to access media available through the user's group. The user, at home$_A$, determines that source devices at home$_B$ and home$_C$ are contained within the user's group. The user, using static IP addresses, directly established a connection, over the wide area network, with home$_B$ and home$_C$. Once a connection is established, services may be obtained similar to the process described above (e.g., discovery, aggregation, transcoding, digital rights management function, copying media, streaming media, etc.). For the example of FIG. 7, the digital media player 730 obtains the available media items (1-6) from digital media server 770 and media items (7-12) from digital media server 750.

One issue regarding the use of a static IP address approach is that home locations typically do not have a static IP address (i.e., the IP address is dynamic). Typically, an Internet service provider, such as a high-speed Internet service provider that uses digital subscription line ("DSL") or cable modem technology, dynamically assigns IP addresses to its users. Thus, a destination device may have an accurate account of static IP addresses for different devices within its group. In one embodiment, to solve this problem, services may be used to translate between a known domain name address and the dynamic IP address currently assigned to the network access for the source device (e.g., Dynamicons).

Figure 9:
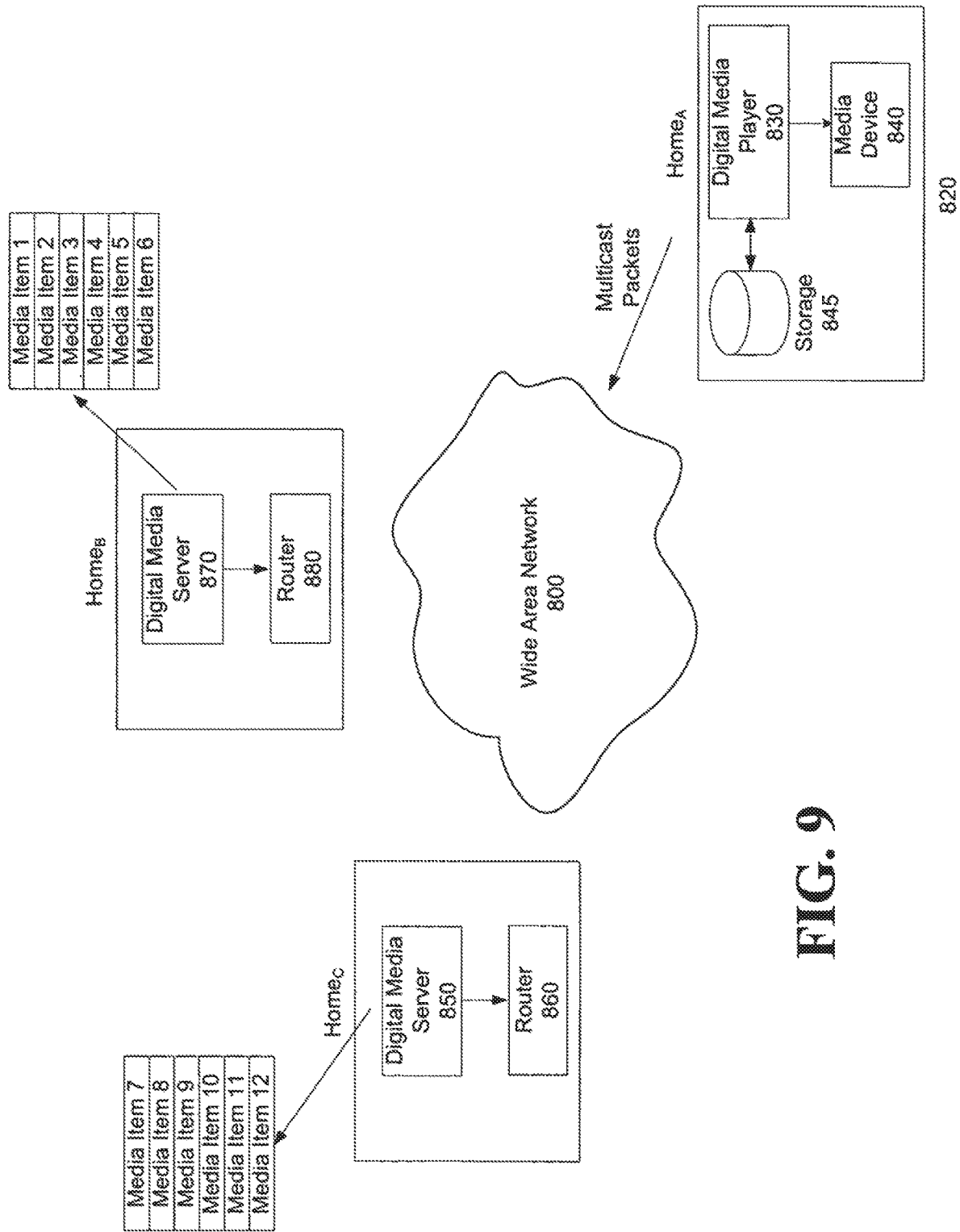
FIG. 9 illustrates one embodiment for using multi-cast packets to integrate media across a wide area network.

Other embodiments may also be implemented to eliminate the use of a third party service (e.g., WAN media service). FIG. 9 illustrates one embodiment for using multi-cast packets to integrate media across a wide area network. For this embodiment, digital media player 830 constitutes the destination device, and as such, desires to integrate media from digital media server 870 (home$_B$) and digital media server 850 (home$_C$). Similar to the static IP embodiment, each location, participating in the media integration, stores group information. If a user desires to integrate media within the user's group, network information to identify the group is extracted. With the information, the destination device formulates multi-cast network packets that identify all network locations for source devices in the user's group. The multi-cast packets may be configured to identify nodes on a local area network, nodes that form an organization, or nodes on a public packet-based network (e.g., Internet). The destination device (e.g., digital media player 830) transmits the multi-cast packets across the wide area network 800. Routers (e.g., routers 880 and 830) interpret the network information contained in the multi-cast packets, and subsequently transmit or deny the packets.

In response to receipt of the multi-cast packets, source devices (e.g., digital media servers 830 and 880) determine permissions for the source device, from their group information, and permit discovery of media by devices at home$_A$. For example, home$_A$ may implement client side aggregation of media by digital media player 830. In other embodiments, home$_A$ may include a digital media server that performs server aggregate for devices integrated on home$_A$'s media network. After discovery, a user may select one or more available media items. In response to the selection, digital media player 830 formulates multi-cast packets over the wide area network 800. Routers on open Internet often do not allow multi-cast packets to flow through so that typically devices can not be heard across the WAN.

Media Aggregation Embodiments

Figure 10:
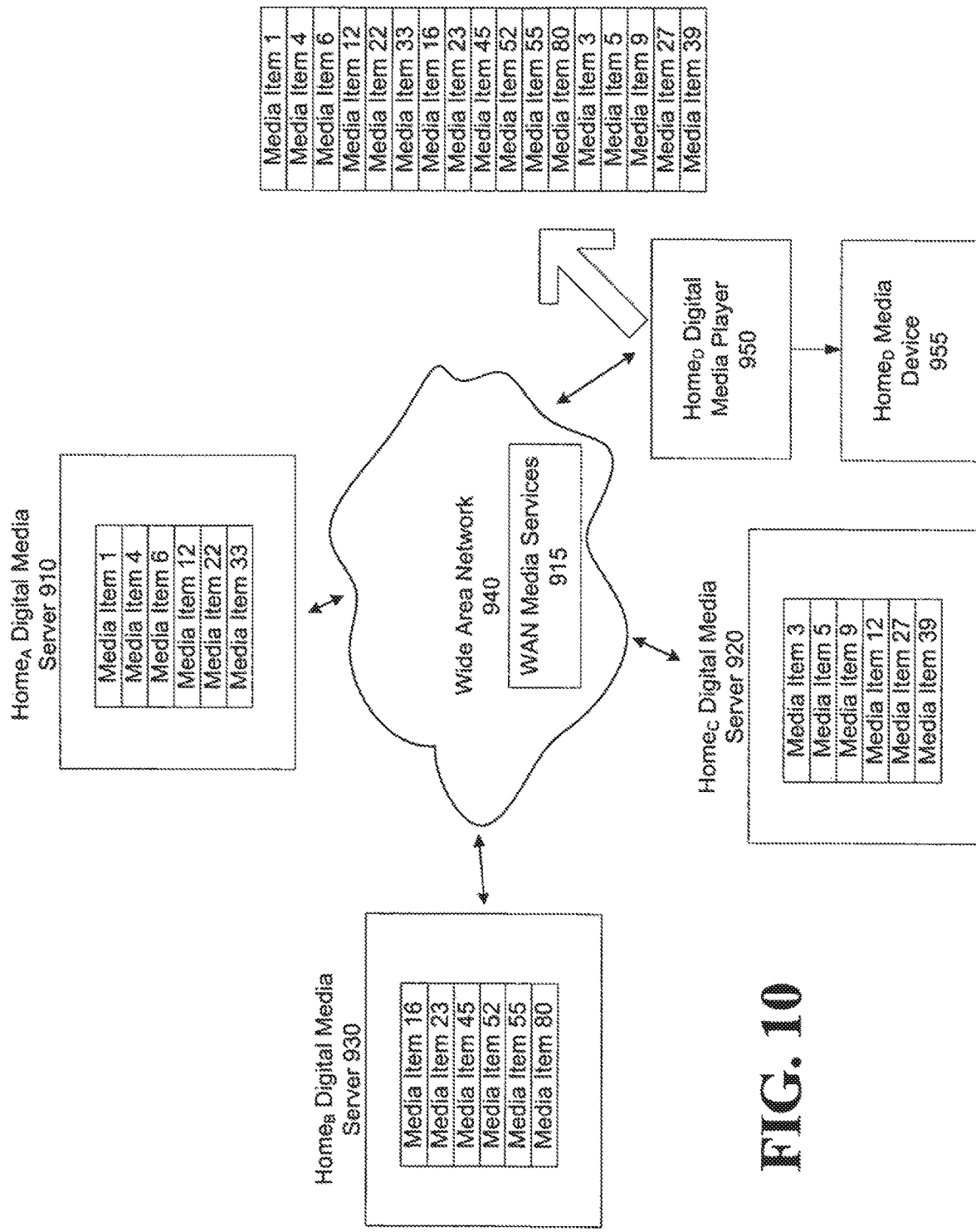
FIG. 10 illustrates client side aggregation of media in a wide area network in accordance with one embodiment of the present invention.

FIG. 10 illustrates client side aggregation of media in a wide area network in accordance with one embodiment of the present invention. For this example, three media servers (910, 920, and 930), located at three disparate locations (home$_A$, home$_B$ and home$_C$), are coupled to wide area network 940. As shown in FIG. 10, each media server stores various media items (e.g., video, audio, photos, etc.). For example, media server 910, at home$_A$, stores media items 1, 4, 6, 12, 22 and 33. For this example, DMP 950, located at home$_D$, is also coupled to wide area network 940. DMP 950 may comprise a television, and the media items, stored on media servers 910, 920 and 930, may comprise video.

After completing a discovery process, DMP 950, at home$_D$, determines relevant media items stored on other devices (e.g., media servers) available through wide area network 940. For this example, DMP 950, at home$_D$, aggregates all media items relevant to DMP 950, for use at media device 955 (i.e., playback, control, etc.). For example, if media device 955 is a television, then media device aggregates a list of all media items, such as video and digital photos, suitable for playback on a television. As shown in FIG. 10, DMP 950 aggregates all media items stored on media servers 910, 920 and 930 located at home$_A$, home$_B$ and home$_C$, respectively.

Figure 11:
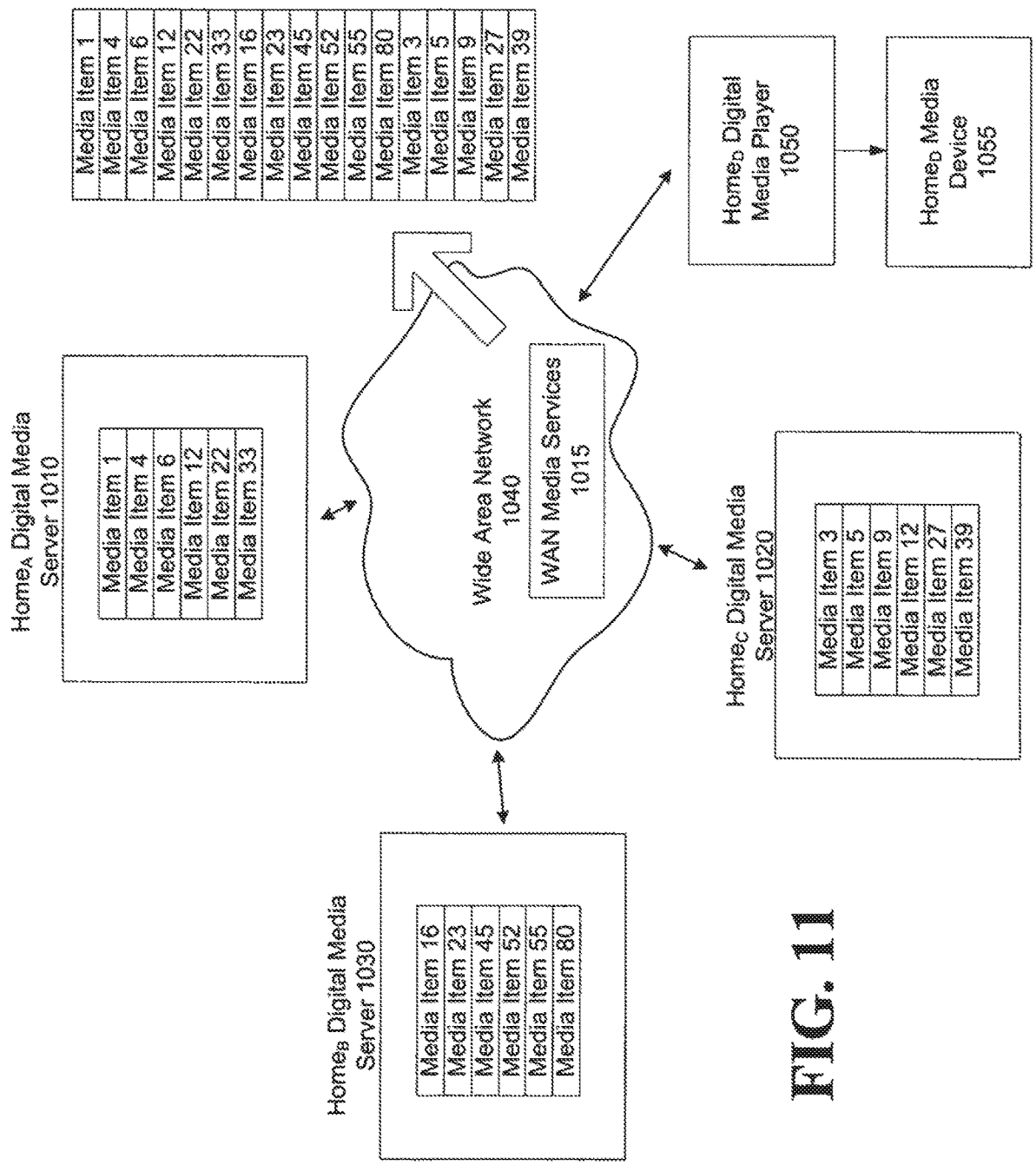
FIG. 11 illustrates service aggregation of media in a wide area network in accordance with one embodiment of the present invention.

FIG. 11 illustrates service aggregation of media in a wide area network in accordance with one embodiment of the present invention. Similar to the example of FIG. 10, three media servers (1010, 1020, and 1030) for home$_A$, home$_B$ and home$_C$ are coupled to wide area network 1040. Each media server (1010, 1020, and 1030) stores various media items. For this example, media device 1050 (home$_D$) is also coupled to wide area network 1040. For service aggregation, WAN media service 1015 determines media items stored on other devices (e.g., media servers) available through wide area network 940 after completing a discovery process. For this example, WAN media service 1015 aggregates all media items for use at media device 1050. The list of media items aggregated by WAN media services 1015 is shown in FIG. 11.

Figure 12:
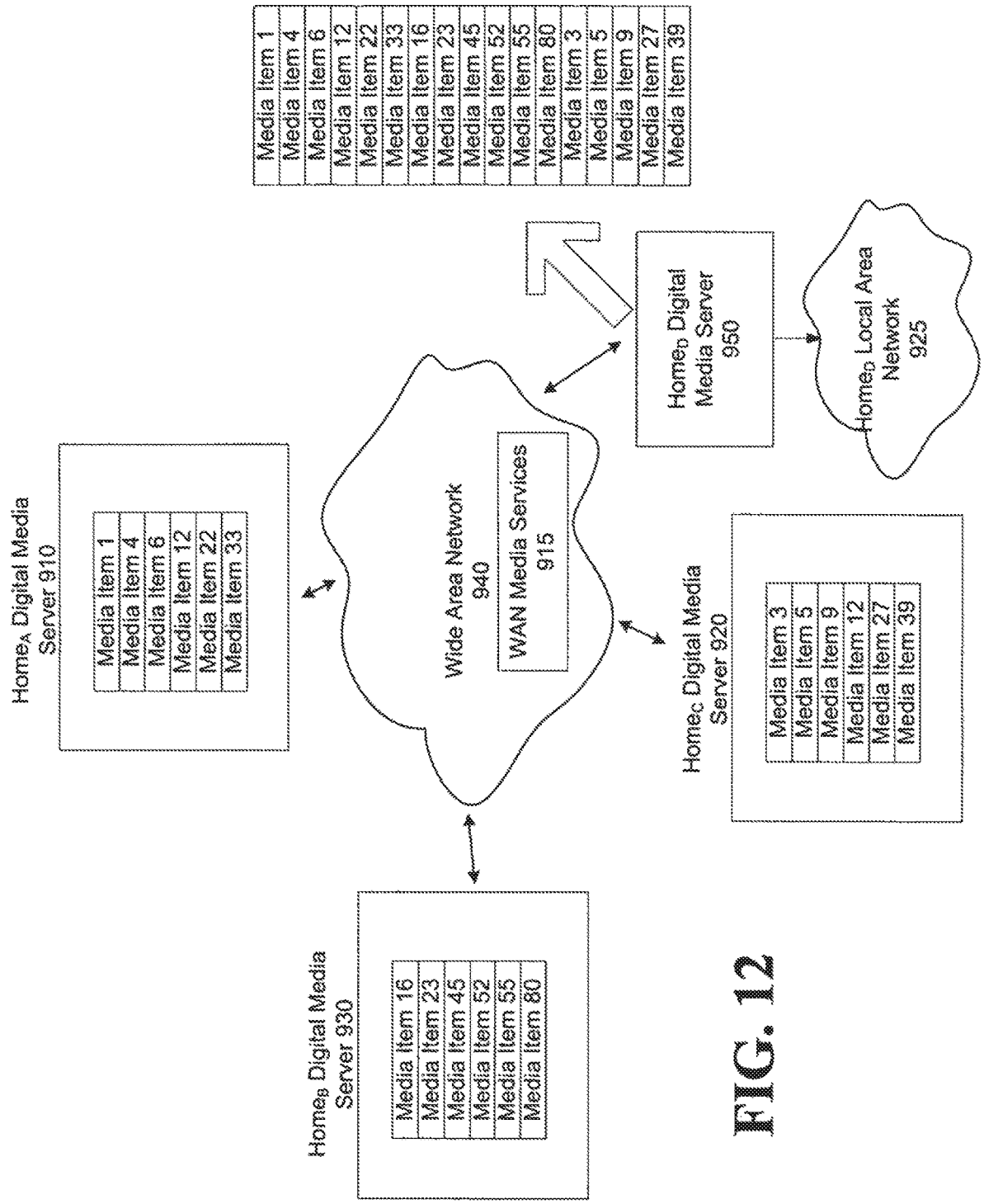
FIG. 12 illustrates server aggregation of media in a wide area network in accordance with one embodiment of the present invention.

FIG. 12 illustrates server aggregation of media in a wide area network in accordance with one embodiment of the present invention. Similar to the examples of FIG. 10 and FIG. 11, three media servers (910, 920, and 930) for home$_A$, home$_B$ and home$_C$ are coupled to wide area network 940, and digital media server 950, located at home$_0$, is also coupled to wide area network 940. As shown in FIG. 12, digital media server 940 is coupled to home$_D$ local area network 925. Home local area network 925 couples one or more digital media players, media devices and/or digital media servers. For server aggregation, digital media server 950 determines media items stored on media servers (910, 920, and 930) and available through wide area network 940. The list of media items aggregated by digital media server is shown in FIG. 12.

In order to aggregate media items (e.g., service, client or server), the WAN media system supports discovery services. In one embodiment, the discovery process implements asynchronous based messaging. The discovery protocol operates on any network that supports packet based messaging or on a serialized network. In one embodiment, the discovery protocol includes an "announce" command, a "discovery" command, and a "bye-bye" command. The announce command is used by a device to announce its presence on the wide area media network. A discovery command is a request for an announcement (i.e., queries whether any media devices are accessible by the wide area network). The "bye-bye" command is used by a media device to announce that the media device is leaving the network. In one embodiment, there are two types of announcements and two types of "bye-bye" commands: one for devices and one for services.

In one embodiment, a remote procedure call (RPC) mechanism uses a packet-based protocol. In general, an RPC mechanism permits a device to control another device on the network. The services include methods and an identification number to permit a device on the wide area network to construct RPC based packets with the appropriate arguments. The protocol is effectuated through requests and responses. The RPC packets include a header. In one embodiment, the header contains: version information, a command class (maps to a particular service), the command (the method the device is requesting or the response coming from the method), an identification (identification of requests or identification of responses corresponding to a request), and a length. After the header, the RPC protocol format specifies data (i.e., arguments for requests and returns values for responses).

In addition to discovery, the WAN integrated media system may perform one or more "transcoding" services. As used herein, "transcoding" may refer to any or all of the following: transcaling (changing the resolution of a digital media file), transcypting (changing the encryption of a digital media file), transcoding (changing the format of a digital media file), and transrating (changing the bit rate of a digital media file). In one embodiment, transcoding occurs at the source location for the media device (i.e., the location streaming the media or transferring a copy of a digital media file); Under certain circumstances, if transcoding occurs at the source location, then the transfer may consume less bandwidth. For example, if the bit rate of streaming media is reduced, then the amount of network bandwidth required to transmit the streaming media is also reduced. In other embodiments, transcoding services may be performed at the WAN media services, or at the destination location. Some embodiments for transcoding are described in U.S. patent application Ser. No. 10/949,775, entitled "Methods and Apparatus for Integrating Disparate Media Formats In A Networked Media System", filed Sep. 23, 2004, inventors Daniel Putterman and Brad Dietrich, which is expressly incorporated herein by reference.

The WAN integrated media system may also implement digital rights management ("DRM") protections on the media items and files. In one embodiment, the source location (e.g., digital media server) implements a primary DRM scheme. In other embodiments, the digital media server, at the source location, may implement a link layer encoding scheme. The WAN integrated media system may use any DRM scheme when distributing media across the wide area network without deviating from the spirit or scope of the invention.

Figure 13:
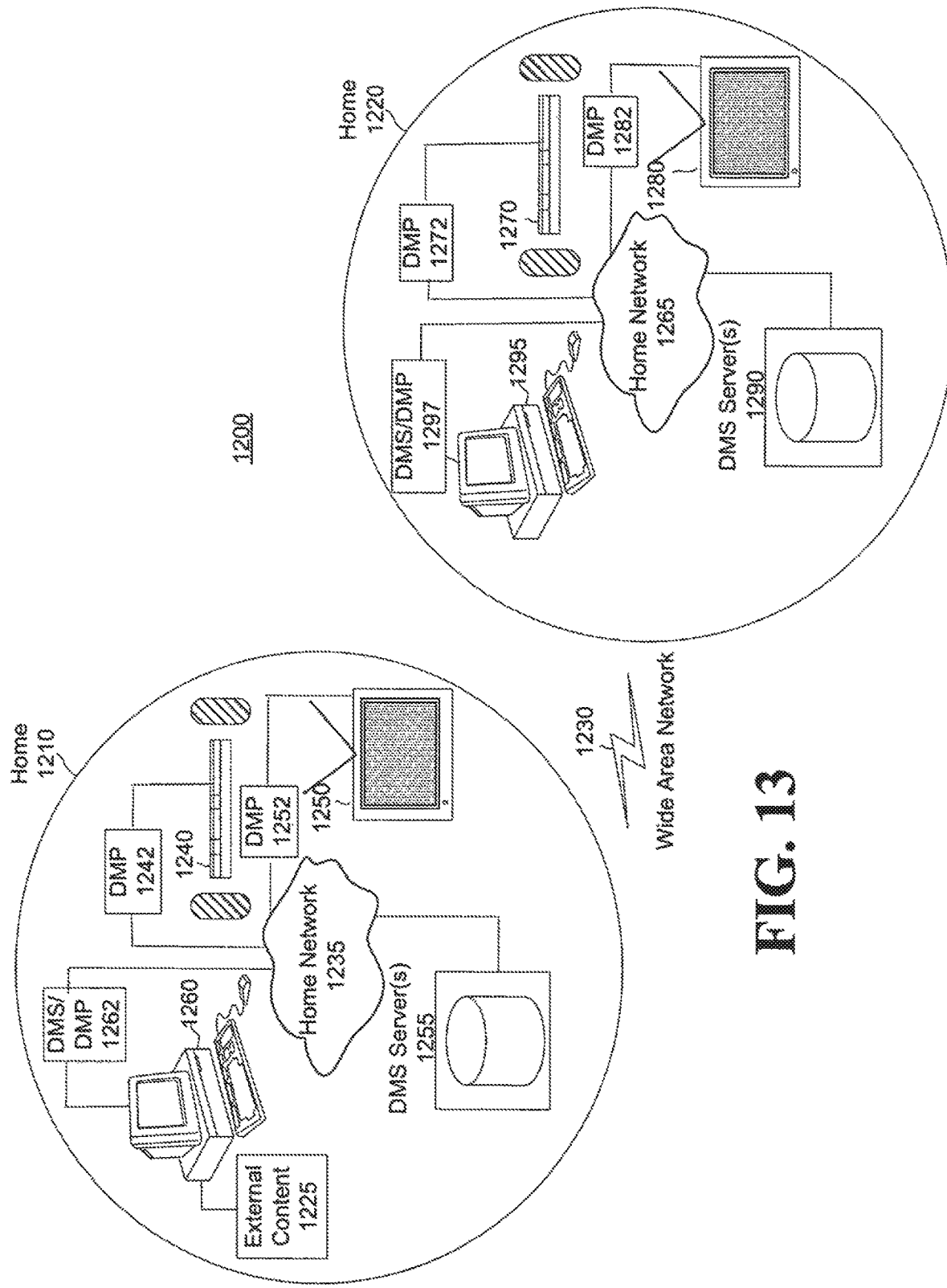
FIG. 13 illustrates one, embodiment for two home networks coupled by a wide area network.

Example Home Media Network:

A home may comprise a home network that includes one or more media devices coupled together via a home network. FIG. 13 illustrates one embodiment for two home networks coupled by a wide area network. For the example of FIG. 13, home 1210 and home 1220 comprise a plurality of media devices. The media devices, when connected through a home network, provide an integrated media system. Specifically, home network 1235 couples media devices in home 1210, and home network 1265 couples media devices in home 1220. Homes 1210 and 1220 communicate through wide area network 1230. Networks 1235 and 1265 may comprise any type of network, including wireless networks. For example, networks 1235 and 1265 may comprise networks implemented in accordance with standards, such as IEEE 802.3, HPNA, Home Plug, IEEE 802.11x, IEEE 1394, Blue Tooth, and USB 1:1/2.0.

A media device provides at least one service to the integrated media system. For the example of FIG. 13, media devices include a computer system (1260 for home 1210 and 1295 for home 1220). In one embodiment, the computer system (1260 and 1295) may operate as a media manager. A media manager is an optional component for the integrated media system. In general, the media manager permits the user to organize, download, and edit media in the personal computer "PC" environment. The media manager may store media for integration into the wide area media space (i.e., store media for use by other components in the wide area media space). In one embodiment, the media manager permits the user to perform system functions on a PC that are less suitable for implementation on a television based user interface.

The example integrated home media system also includes a digital media server (digital media server 1255 for home 1210 and digital media server 1290 for home 1220). The digital media servers (1255 and 1290) store or present media to the system. Although digital media servers (1255 and 1290) are depicted as hard disk drives in FIG. 13, the digital media severs present media items to the home media networks, which may or may not reside on permanent storage. In one embodiment, digital media servers (1255 and 1290) store digital media, such as digital audio, digital video (e.g., DVD, MPEG, etc.), and digital images. The digital media servers (1255 and 1290) store media for distribution throughout the wide area media space. The digital media servers (1255 and 1290) are coupled to different types of media players, including televisions 1250 and 1280, as well as an audio players 1240 and 1270 (e.g., stereo systems). In one embodiment, the media servers (1255 and 1290) execute software to perform a variety of functions for the integrated media system.

For the embodiment of FIG. 13, one or more DMPs (1262, 1242, 1252, 1297, 1272, and 1282) are integrated into the home network. In general, the DMPs permit interoperability of standard media devices. For example, a DMP may perform the role of a digital media player by playing back digital media stored on digital media server 1292 on standard legacy television 1250. In one embodiment, the DMPs may comprise stand-alone devices interfaced with the associated media device. In other embodiments, the DMPs may be integrated directly into the associated media device. For the example of FIG. 13, DMPs (1252 and 1282) may be integrated into televisions (1250 and 1280), DMPs (1242 and 1272) may be integrated into audio systems (1240 and 1270), and DMP and DMS (1262 and 1297) may be software executing on Computers (1260 and 1295).

The DMPs receive media from digital media servers 1255 and 1290, and process the media for display or playback on televisions 1250 and 1280 or audio systems 1240 and 1270. For example, digital media servers 1255 and 1290 may transmit a digital movie over networks 1235 and 1265, and the DMP may process the digital movie for display on televisions 1250 and 1280. In one embodiment, DMPs 1252 and 1282 process the digital movie "on the fly" to provide NTSC, PAL, or HD formatted video for playback on televisions 1250 and 1280.

As shown in FIG. 13, the integrated media system also optionally integrates one or more audio media devices into the wide area media space. For the embodiment of FIG. 13, a DMP (1242 and 1272) receives digital music (e.g., MP3 format) from digital media servers 1255 and 1290, and the DMP processes the digital music for playback on standard audio systems 1240 and 1270. In one embodiment, the audio DMP (1242 and 1272) includes a small display (e.g., liquid crystal display "LCD" display) and buttons for use as a user interface. The media servers 1255 and 1290 transmit items and identifiers for the items for display on the audio DMPs. For example, audio DMP 1242 may display lists of tracks playing and/or available for playback on audio system 1240. The user selects items displayed on the screen using the buttons to command the system. For example, the audio DMP screen may display a list of albums available in the wide area media space, and the user, through use of the buttons, may command the user interface to display a list of tracks for a selected album. Then, the user may select a track displayed on the screen for playback on audio system 1240.

In one embodiment, the user interface for the integrated media system is implemented using digital media servers (1255 and 1290) for display on televisions 1250 and 1280. For this embodiment, the user, using a remote control for televisions 1250 and 1280, selects items displayed on the televisions to command the system. The user interface utilizes the DMPs as well as the media devices (e.g., televisions 1250 & 1280). In one embodiment, the user interface includes a plurality of interactive screens displayed on the displays of media devices to permit a user to access the functionality of the system. A screen of the user interface includes one or more items for selection by a user. The user navigates through the user interface using a remote control device (not shown). The user, through use of a remote control, controls the display of screens in the user interface and selects items displayed on the screens A user interface displayed on a television permits the user, using a remote control, to perform a variety of functions pertaining to the media, available in the wide area media space.

The wide area media space may be extended beyond multiple private networks (e.g., home networks) to access media available as a service. In one embodiment, the media system directly integrates content from external sources into the wide area media space. For example, as shown in FIG. 13, computer 1260 may access content external to the local network 1235. The external content may include any type of media, such as digital music and video. The media system may be coupled to external content 1225 through a broadband connection (i.e., high bandwidth communications link) to permit downloading of media content. The external content may be delivered to the media system through use of the Internet, or the external content may be delivered through use of private distribution networks (e.g., digital cable subscription).

The media system may be implemented in either hardware or software. For the software implementation, the media system is software that includes a plurality of computer executable instructions for implementation on a general-purpose computer system. Prior to loading into a general-purpose computer system, the media system software may reside as encoded information on a computer readable medium, such as a magnetic floppy disk, magnetic tape, and compact disc read only memory (CD-ROM). In one hardware implementation, the media system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A media system comprising:
a plurality of digital media servers coupled to a digital media player over a wide area network; and
a wide area network media service, accessible via the wide area network, the wide area network media service being configured to issue a discovery command that requests an announcement from any media device accessible by the wide area network;
wherein:
the wide area network media service comprises storage for storing group information, wherein the group information identifies at least one media item that users in a group are permitted to access, and wherein the group information links the digital media player to a user in the group;
the wide area network media service is configured to identify a number of digital media servers that the digital media player within the group has permission to access;
the wide area network media service is configured to determine that the digital media player has permission to access the at least one media item from the identified number of digital media servers based on the group information;
the wide area network media service is configured to, based on the determination, broker connections between the digital media player and respective ones of the plurality of digital media servers; and
the digital media player is configured to generate a list of the media items that the digital media player is permitted to access from the plurality of digital media servers to enable user selection of one or more of the media items from the list, and
wherein the media system is configured to enable access to the one or more of the media items selected from the list via the user selection without passing through the wide area network media service.

2. The media system of claim 1, wherein the wide area network media service is configured to:
receive a request from the digital media player for a media item in the list of media items;
identify a first digital media server of the identified number of digital media servers, the first digital media server containing the requested media item; and
deliver the requested media item to the digital media player from the first digital media server.

3. The media system of claim 2, wherein the wide area network media service is configured to deliver the requested media item by streaming the requested media item from the first digital media server to the digital media player.

4. The media system of claim 1, further comprising a media device, coupled to the digital media player, for playing the requested media item.

5. The media system of claim 2, wherein at least one of the identified number of digital media servers is coupled to at least one additional digital media server over a local area network.

6. The media system of claim 1, wherein the group information identifies one or more devices associated with a user in the group.

7. The media system of claim 2, wherein the identified first digital media server is configured to transcode the requested media item from a first digital format to a second digital format.

8. The media system of claim 1, wherein the wide area network media service is configured to aggregate the at least one media item based on the permission.

9. The media system of claim 1, wherein the wide area network media service is configured to aggregate the at least one media item based on at least one capability of at least one component of the media system.

10. The media system of claim 1, wherein the wide area network media service is configured to aggregate the at least one media item based on the permission, and at least one capability of at least one component of the media system.

11. A method comprising:
providing a wide area network media service within a wide area network, the wide area network media service comprising storage for storing group information that identifies at least one media item that users in a group are permitted to access, and wherein the group information links a digital media player to a user in the group;
identifying a number of digital media servers that the digital media player within the group has permission to access;
issuing, via the wide area network media service, a discovery command that requests an announcement from any digital media servers accessible by the wide area network, wherein the digital media player is coupled to the plurality of digital media servers over the wide area network;
determining, based on the stored group information, that the digital media player has permission to access the at least one media item from the plurality of digital media servers;
based on the determination, brokering connections between the digital media player and respective ones of the plurality of digital media servers via the wide area network media service;
generating, with the digital media player, a list of the media items that the digital media player is permitted to access from the plurality of digital media servers to enable user selection of one or more of the media items from the list; and
enabling access to the one or more of the media items selected from the list via the user selection without passing through the wide area network media service.

12. The method of claim 11, further comprising:
receiving, with the wide area network media service, a request from the digital media player for a media item in the list of media items;
identifying a first digital media server of the plurality of digital media servers, the first digital media server containing the requested media item; and
delivering the requested media item to the digital media player from the first digital media server.

13. The method of claim 12, wherein the delivering comprises streaming the requested media item from the first digital media server to the digital media player.

14. The method of claim 11, further comprising playing the requested media item on a media device coupled to the digital media player.

15. The method of claim 12, wherein at least one of the plurality of digital media servers is coupled to at least one additional digital media server over a local area network.

16. The method of claim 11, wherein the group information identifies one or more devices associated with a user in the group.

17. The method of claim 12, further comprising transcoding, at the identified first digital media server, the requested media item from a first digital format to a second digital format.

18. The method of claim 11, further comprising aggregating the at least one media item based on the permission.

19. The method of claim 11, further comprising aggregating the at least one media item based on at least one capability of at least one component of the media system.

20. The method of claim 11, further comprising aggregating the at least one media item based on the permission, and at least one capability of at least one component of the media system.

* * * * *